United States Patent
Branson et al.

(10) Patent No.: US 8,549,169 B2
(45) Date of Patent: Oct. 1, 2013

(54) OVERLOADING PROCESSING UNITS IN A DISTRIBUTED ENVIRONMENT

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/684,559

(22) Filed: Nov. 25, 2012

(65) Prior Publication Data
US 2013/0080654 A1    Mar. 28, 2013

Related U.S. Application Data

(63) Continuation of application No. 13/152,451, filed on Jun. 3, 2011.

(51) Int. Cl.
 *G06F 15/173* (2006.01)
(52) U.S. Cl.
 USPC ............................. 709/236; 709/231; 709/232

(58) Field of Classification Search
 USPC .................................................. 709/230–236
 See application file for complete search history.

(56) References Cited

U.S. PATENT DOCUMENTS

| | | | |
|---|---|---|---|
| 7,694,006 B2* | 4/2010 | Boic et al. | 709/231 |
| 8,027,365 B2* | 9/2011 | Boic et al. | 370/474 |
| 2004/0213291 A1* | 10/2004 | Beshai et al. | 370/473 |
| 2008/0019348 A1* | 1/2008 | Shimizu et al. | 370/345 |
| 2009/0028188 A1* | 1/2009 | Boic et al. | 370/474 |
| 2009/0031007 A1* | 1/2009 | Boic et al. | 709/219 |

OTHER PUBLICATIONS

U.S. Appl. No. 13/152,451, entitled Overloading Processing Units in a Distributed Environment, filed Jun. 3, 2011.

* cited by examiner

*Primary Examiner* — Kenneth R Coulter
(74) *Attorney, Agent, or Firm* — Patterson & Sheridan LLP

(57) ABSTRACT

Techniques are disclosed for overloading, at one or more nodes, an output of data streams containing data tuples. A first plurality of tuples is received via a first data stream and a second plurality of tuples is received via a second data stream. A first value associated with the first data stream and a second value associated with the second data stream are established based on a specified metric. A third plurality of tuples is output based on the first value and the second value, wherein the third plurality of tuples is a subset of the first plurality of tuples and the second plurality of tuples.

10 Claims, 5 Drawing Sheets

OVERLOADING PROCESSING UNITS IN A DISTRIBUTED ENVIRONMENT

CROSS-REFERENCE TO RELATED APPLICATIONS

This application is a continuation of co-pending U.S. patent application Ser. No. 13/152,451, filed Jun. 3, 2011. The aforementioned related patent application is herein incorporated by reference in its entirety.

BACKGROUND

Computer databases have become extremely sophisticated, e.g., the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems, where products are available and allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

One or more data streams may provide a continuous flow of data tuples from source processing elements to destination processing elements. In some cases, non-pertinent data tuples are transmitted between the processing elements, resulting in unnecessary consumption of processing power and bandwidth.

SUMMARY

One embodiment of the invention provides a technique for overloading, at one or more nodes, an output of data streams containing data tuples. A first plurality of tuples is received via a first data stream and a second plurality of tuples is received via a second data stream. A first value associated with the first data stream and a second value associated with the second data stream are established based on a specified metric. A third plurality of tuples is output based on the first value and the second value, wherein the third plurality of tuples is a subset of the first plurality of tuples and the second plurality of tuples.

Another embodiment of the invention provides a system that comprises a plurality of compute nodes, each comprising a processor and a memory, wherein the memory stores a data overloading application which, when executed the compute node, is configured to perform an operation for overloading an output of stream data. The operation comprises receiving a first plurality of tuples via a first data stream and a second plurality of tuples via a second data stream, establishing, based on a specified metric, a first value associated with the first data stream and a second value associated with the second data stream, and outputting, based on the first value and the second value, a third plurality of tuples, wherein the third plurality of tuples is a subset of the first plurality of tuples and the second plurality of tuples.

Further embodiments of the invention provide a non-transitory computer readable storage medium that includes instructions for causing a computer system carry out on or more of the methods set forth above.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
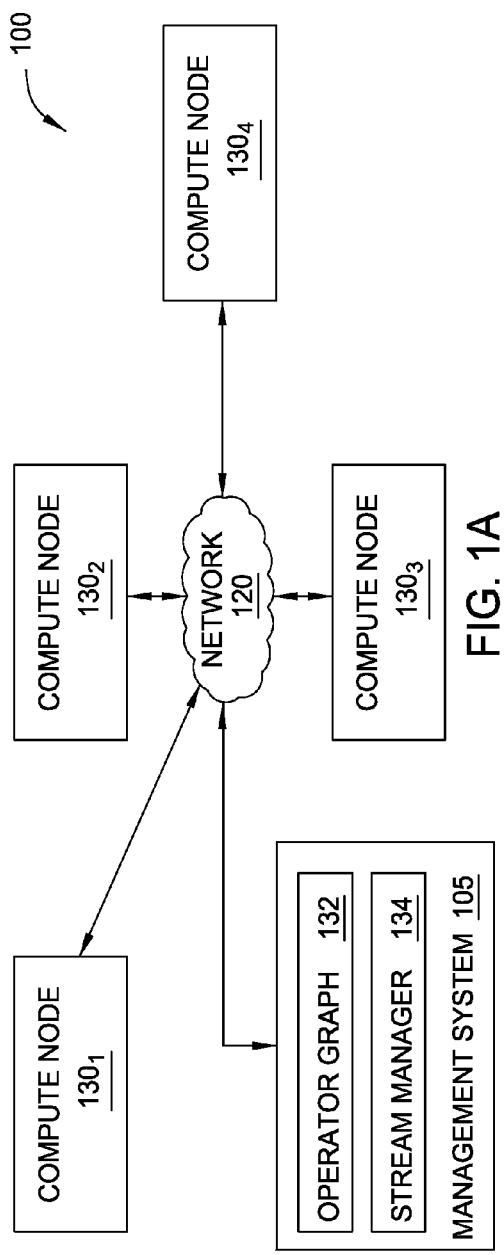
FIGS. 1A-1B illustrate a computing infrastructure configured to execute a stream database application, according to an embodiment of the invention.

Embodiments of the invention provide techniques for dynamically adjusting data flows of data streams within a stream application. One or more processing elements receive data from the data stream, perform an analysis of the data stream and adjust a rate at which the data stream is output therefrom, referred to herein as "overloading." Additionally, a stream manager may be configured to monitor and control the overloading of data streams. As a result, wasteful consumption of processing and bandwidth resources is reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1B:
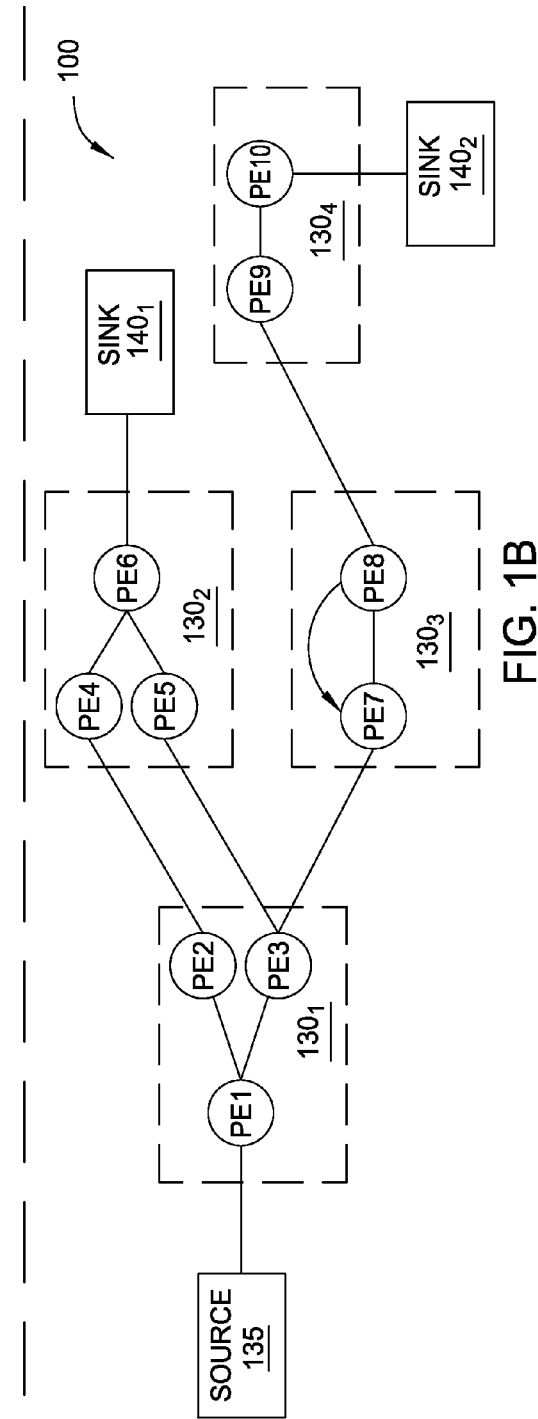

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. The operator graph 132 represents a stream application beginning from of one or more source processing elements (PEs) through to one or more sink PEs. Data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on the received tuple, including, e.g., writing to database tables or performing other database operations such as data joins, splits, reads, etc., as well as performing other data analytic functions or operations.

The stream manager 134 may be configured to monitor a stream application running on the compute nodes $130_{1-4}$ as well as change the structure of the operator graph 132. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source PE 135 (labeled as PE1) and ends at sink PEs $140_{1-2}$ (labeled as PE6 and PE10). Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which emits tuples processed by sink PE10 $140_2$.

Figure 2:
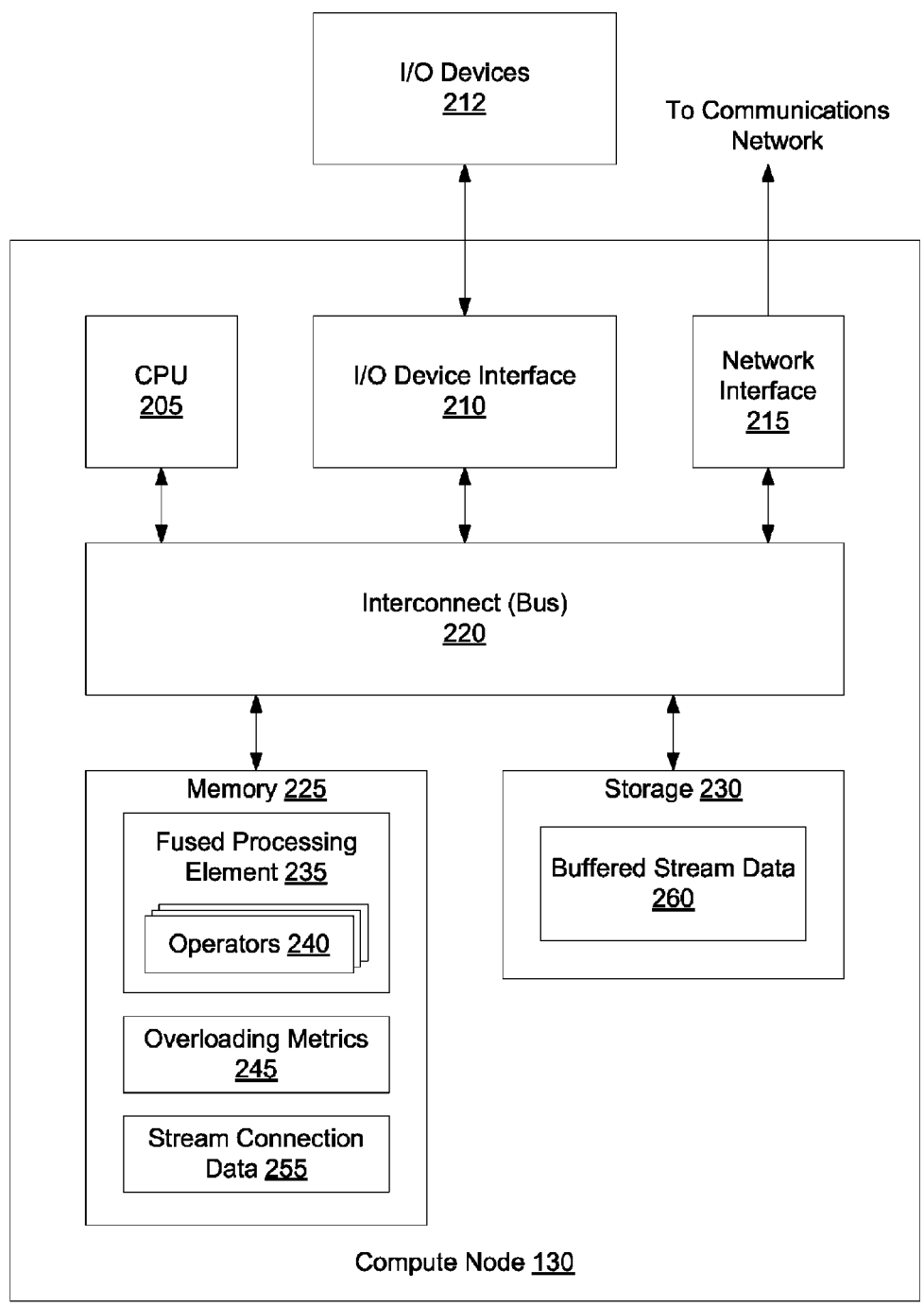
FIG. 2 illustrates a compute node, according to an embodiment of the invention.

FIG. 2 is a more detailed view of one of the compute nodes 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a fused processing element (PE) 235, overloading metrics 245, and stream connection data 255. The fused PE 235 includes a collection of operators 240. As noted above, each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessed over the data communications network 120. The stream connection data 255 represents the connections between PEs on compute node 130 (e.g., a TCP/IP socket connection between the fused PE 240 and un-fused PE 245), as well as connections to other compute nodes 130 with upstream and or downstream PEs in the stream application, also via TCP/IP sockets (or other inter-process data communication mechanisms).

Buffered stream data 260 represents a storage space for data flowing into the compute node 105 from upstream processing elements (or from a data source for the stream application). For example, buffered stream data may include data tuples waiting to be processed by one of the PEs 240 or 245. Buffered stream data 260 may also store the results of data processing performed by PEs 240 or 245 that will be sent to downstream processing elements. However, both the amount and rate at which the buffered stream data 260 is transferred to downstream processing elements is based on an analysis performed by the overloading metrics 245.

Overloading metrics 245 provides executable code configured to analyze stream data and, based on the analysis, output one or more result values. More specifically, the overloading metrics 245 coincides with the type of data that the PE 235 is configured to process, e.g., text-based analyses of a news feed received from a source. In one example, the overloading metrics 245 causes the CPU 205 to analyze the news feed data based on keyword searches, publication dates, a number of user comments, a number of views received, etc., and each is assigned a result value. Upon completion of the analysis, the PE 235 overloads, based on the result values, the rate at which data flows from the PE 235 to subsequent PEs in the stream application—i.e., adjusting the transfer speed, adjusting a number of tuples that are transferred, and the like. The foregoing is described in further detail below in conjunction with FIGS. 4-5.

Figure 3:
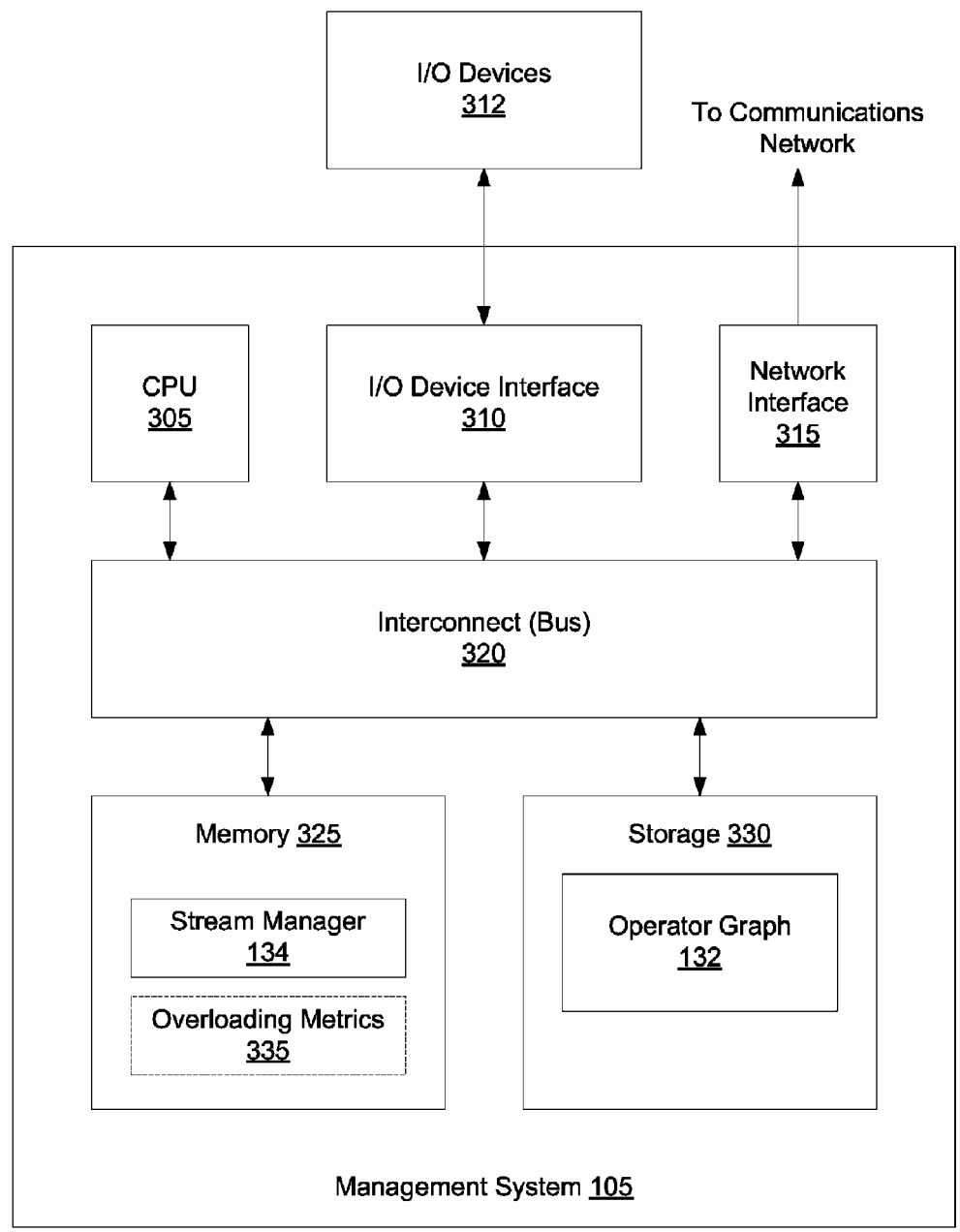
FIG. 3 illustrates a management system, according to an embodiment of the invention.

FIG. 3 is a more detailed view of the management system 105 of FIG. 1, according to one embodiment of the invention. As shown, management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display, and mouse devices) to the management system 105.

CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. The storage 330 includes an operator graph 132. The operator graph 132 represents a stream application beginning from of one or more source processing elements (PEs) through to one or more sink PEs. In one embodiment, the stream manager 134 monitors a stream application running on the compute nodes $130_{1-4}$ and changes the structure of the operator graph 132 as needed. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

In addition, the stream manager 134 may be configured to include overloading metrics 335 and, if included, configuration data that determines at which PEs data stream overloading takes place. In this way, data overloading may take place at the source PE 135, at the sink PE 140, or at any other processing element. Additionally, each PE may actively communicate, to the stream manager 134, analysis data established locally at the PE using overloading metrics 245. For example, a first PE and a second PE may present individual analyses of different data streams to the stream manager 134, whereupon the stream manager 134 aggregates the analyses and instructs both the first PE and the second PE to appropriately adjust their data stream outputs. Of course, any number of stream managers 134 and/or PEs may be configured to interact with one another.

Figure 4:
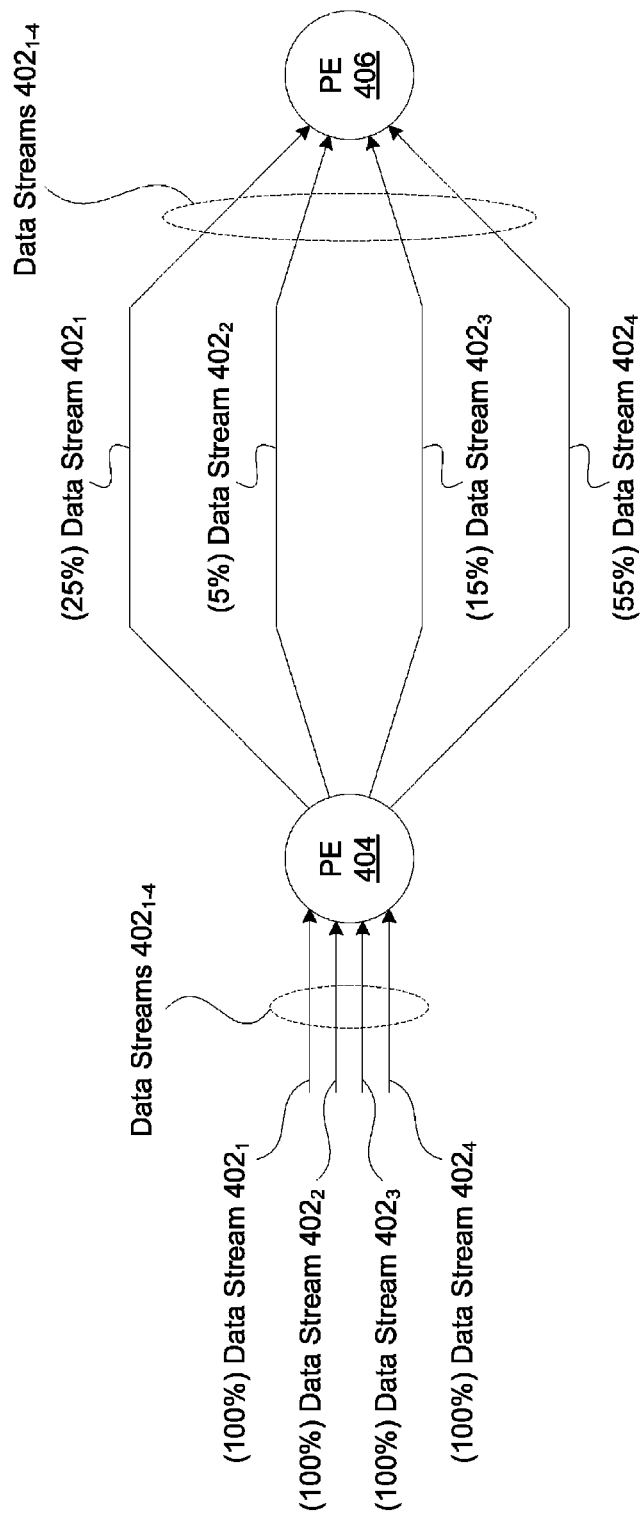
FIG. 4 illustrates overloading one or more data streams, according to an embodiment of the invention.

FIG. 4 illustrates overloading one or more data streams, according to an embodiment of the invention. As shown, data streams $402_{1-4}$ flow uninhibited, e.g., at 100% capacity, into a PE 404 being executed by a node, i.e., the compute node 130. The data streams $402_{1-4}$ may arrive via separate connections to the PE 404, or by a single connection, e.g., a single port. Here, the PE 404 is configured to analyze each of the data streams $402_{1-4}$ according to the overloading metrics associated therewith. As further shown, the PE 404 outputs different portions of the data streams $402_{1-4}$ to a downstream PE 406 to be subsequently processed, at which point PE 406 may further adjust each data stream according to another set of overloading metrics, i.e., overloading metrics 345 associated with a stream manager 134 that communicates with the PE 406.

The data overloading discussed herein is not limited to adjusting output rates merely by percentages, but by any conceivable technique. For example, the PE 404 may be configured to throttle data output at particular bit rate (e.g., 1 MB/second), allow only a threshold amount of data to be transferred, to automatically discard certain types of data, and the like.

Thus, embodiments of the invention render the single port as a "smart port" that is able to select which data streams are accepted and, further, to adjust the amount of data received via the data streams and forwarded to subsequent processing elements—i.e., overloading the data streams.

Figure 5:
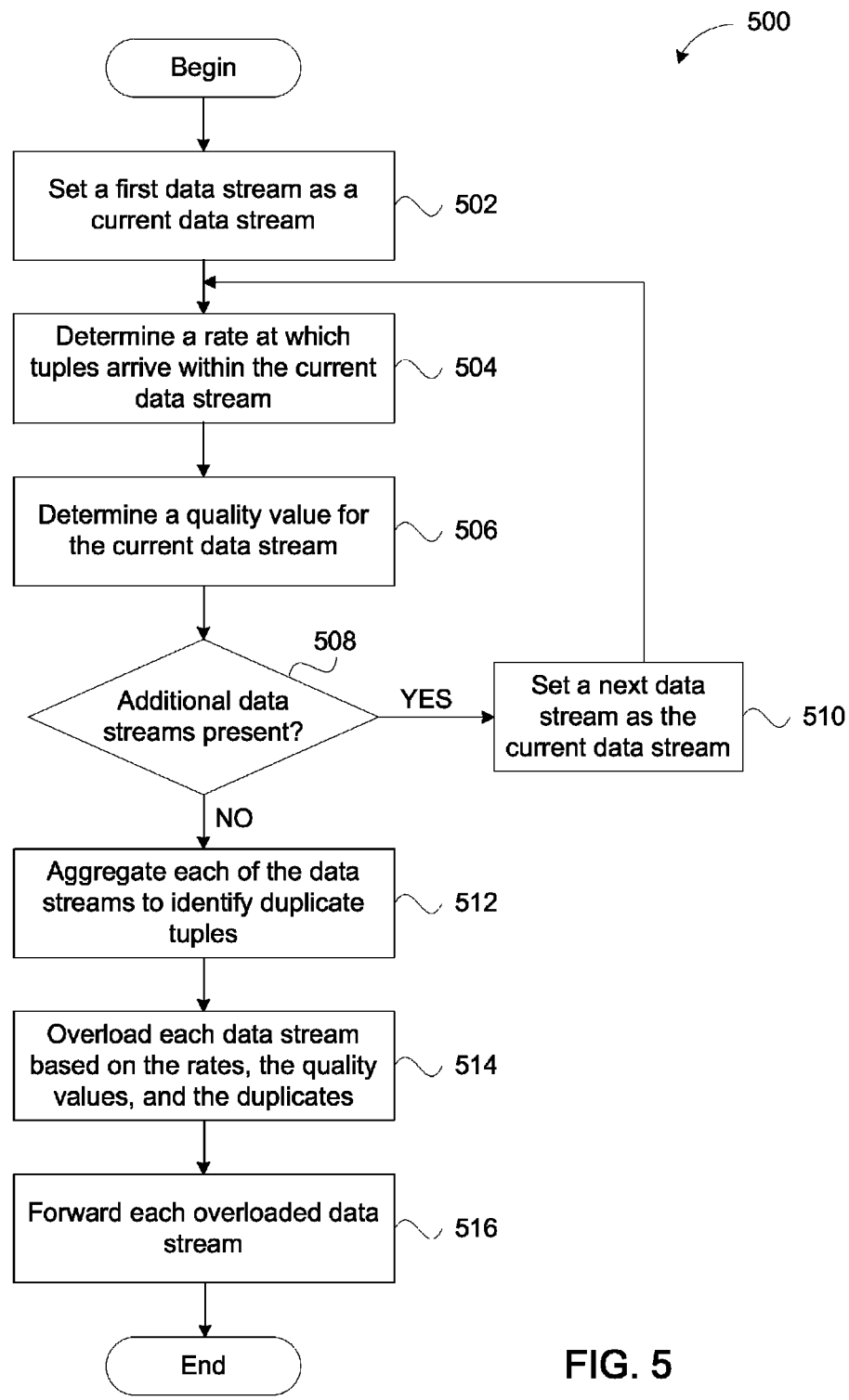
FIG. 5 illustrates a method for dynamically overloading one or more data streams, according to an embodiment of the invention.

FIG. 5 is a flowchart of a method 500 for dynamically overloading one or more data streams, according to an embodiment of the invention. In one embodiment, the method steps 500 are performed by a PE included in a compute node (i.e., the compute node 130). In an alternative embodiment, the management system 105 may be configured to perform the method steps 500. As shown, the method 500 begins at step 502, where a PE—such as the PE 404—sets a first data stream as a current data stream. Again, each data stream may be received via a separate, dedicated port, or via one or more ports that concurrently receive data from one or more data streams, i.e., "smart ports." In one example, with reference to FIG. 4, the PE 404 sets the data stream $402_1$ as the current data stream.

At step 504, the PE 404 determines a rate at which tuples arrive within the current data stream. Such a rate is determinable using a number of techniques including, but not limited to, a network speed at which the tuples arrive (e.g., 400 Kb/s), determining a number of tuples that arrive over an amount of time (e.g., ten per second), and the like.

At step 506, the PE 404 determines a quality value based on the type of tuples being transferred within the current data stream. For example, if the PE 404 is receiving audio data from each of the data streams $402_{1-4}$, then the PE 404 may be configured to detect background interference levels, white noise levels, clarity of voice, clarity of instruments, etc., and assign a corresponding numerical value to each. Accordingly, the numeric values can be summed to produce an overall quality value. In another embodiment, the quality value may be determined based on the quality and/or reliability of the current data stream, e.g., an average number of erroneous tuples included in the data stream, the overall uptime characteristic of the data stream, and the like.

At step 508, the PE 404 determines whether additional data streams 402 are present. If, so, then at step 510, the PE 404 sets a next data stream 402 as the current data stream, and steps 504-506 repeat as described above. More specifically, the PE 404 performs steps 504-506 on each of the data streams $402_{2-4}$. Otherwise, at step 512, the PE 404 aggregates the data streams $402_{1-4}$ to identify duplicate tuples included therein. In one embodiment, the PE 404 is configured to query stream data stored in the memory 225 and storage 230, for each of the streams $402_{1-4}$, to identify any presence of duplicate tuples. For example, with reference to the audio data example described above in step 506, the PE 404 analyzes each of the data streams $402_{1-4}$ to identify duplicate sequences of audio. Such duplications could be present, for example, if two or more audio streams are fed by two microphones that are near one another. The tuples need not be completely identical; instead, the PE 404 may determine that two or more tuples are duplicates if they are similar to one another past a particular threshold, e.g., 60% similar.

At step 514, the PE 404 overloads each data stream 402$_{1-4}$ based on the rates, the quality values, and the duplicates determined according to steps 502-506. In one example, the PE 404 determines that the data stream 402$_1$ and the data stream 402$_4$ include audio data that is 95% similar and, further, that the data stream 402$_4$ has a higher overall quality value than the data stream 402$_1$. Continuing with this example, the PE 404 also determines that the data stream 402$_2$ and the data stream 402$_3$ are separate and distinct in content, while equal in overall quality value and rate. Accordingly, the PE 404 eliminates the transfer of the data stream 402$_1$, and overloads each of the data streams 402$_{2-4}$ to 33.3%. Thus, duplicate and low-quality audio has been removed from the stream application, thereby enhancing the overall efficiency of the computing infrastructure 100. The method 500 then ends.

Advantageously, embodiments of the invention described above provide techniques for overloading data streams in a stream application. In particular, embodiments of the invention provide techniques for adjusting flow rates of one or more data streams based on, but not limited to, the quality of the data, the rate at which the data is being transferred, the identification of duplicate data, and the like. The one or more data streams are actively monitored and the data flow rates thereof are dynamically adjusted, thereby reducing wasteful consumption of processing and bandwidth resources.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   providing a plurality of processing elements comprising one or more operators, the operators configured to process streaming data tuples by operation of one or more computer processors;
   establishing an operator graph of a plurality of operators, the operator graph defining at least one execution path in which a first operator of the plurality of operators is configured to: (i) receive data tuples from at least one upstream operator and (ii) transmit data tuples to at least one downstream operator;
   receiving, at a first processing element of the plurality of processing elements, one or more data tuples associated with a first data stream and one or more data tuples associated with a second data stream;
   establishing, based on a specified metric, a first rate value associated with the first data stream and a second rate value associated with the second data stream;
   identifying a first proper subset of data tuples of the first data stream based on the first rate value and a second proper subset of data tuples based on the second rate value;
   processing, by the first processing element, the first and second proper subsets of data tuples; and
   outputting the first and second proper subsets of data tuples.

2. The computer-implemented method of claim 1, wherein the specified metric is based on a transfer speed at which data tuples are received over a data stream.

3. The computer-implemented method of claim 2, wherein the specified metric is further based on a number of distinct data tuples that are received over a data stream in an amount of time.

4. The computer-implemented method of claim 3, wherein the specified metric is further based on a quality value for each of the first data stream and the second data stream, wherein the quality values are based on one or more calculations performed on each data tuple received via the first and second data streams, and wherein each of the calculations is associated with a type of the data tuple on which the calculation is being performed.

5. The computer-implemented method of claim 4, wherein the quality values are further based on an average number of errors and an uptime characteristic associated with the first and second data streams.

6. The computer-implemented method of claim 5, wherein the first and second proper subsets of tuples are identified by aggregating the one or more data tuples of the first data stream and the one or more data tuples of the second data stream to identify duplicate data tuples that are similar to one another beyond a threshold.

7. The computer-implemented method of claim 6, wherein one or more data tuples of the first data stream that are not in the first proper subset of tuples are not processed and outputted by the first processing element, wherein one or more data tuples of the second data stream that are not in the second proper subset of tuples are not processed and outputted by the first processing element.

8. The computer-implemented method of claim 7, wherein the outputting comprises decreasing a data rate at which the first subset of tuples and second subset of tuples are output to a second processing element, of the plurality of processing elements.

9. The computer-implemented method of claim 8, further comprising:
   forwarding the first rate value, second rate value and quality values to a stream manager;
   receiving, from the stream manager, updated configuration parameters; and
   adjusting, based on the updated configuration parameters, the processing and outputting of the first and second proper subsets of tuples to the second processing element.

10. The computer-implemented method of claim 9, wherein the stream manager aggregates the first rate value, second rate value and quality values with one or more different values each determined at different processing elements of the plurality of processing elements, wherein at least one of the first data stream and the second data stream are received by the first processing element from a data source external to the plurality of processing elements, wherein the first data stream and the second data stream are received through a single input port of the first processing element.

* * * * *